United States Patent [19]

Wood et al.

[11] Patent Number: 4,535,811
[45] Date of Patent: Aug. 20, 1985

[54] AIR FLOW CONTROL APPARATUS

[75] Inventors: Joseph A. Wood, Greenville; William C. Peebles, Jr., Washington, both of N.C.

[73] Assignee: Flanders Filters, Inc., Washington, N.C.

[21] Appl. No.: 572,696

[22] Filed: Jan. 20, 1984

[51] Int. Cl.³ .................... F16K 1/20; F24F 13/10
[52] U.S. Cl. .................... 137/601; 98/41.1; 137/637.1; 251/158; 251/187
[58] Field of Search .......... 98/110, 121 A, 41 R; 137/637, 637.1, 601; 251/158, 187, 228, 279

[56] References Cited

U.S. PATENT DOCUMENTS

| | | | |
|---|---|---|---|
| 2,281,615 | 5/1942 | Peple, Jr. ..................... | 98/40 VT |
| 2,586,997 | 2/1952 | Schach . | |
| 2,890,716 | 6/1959 | Werder ....................... | 137/512.15 |
| 2,974,680 | 3/1961 | Kreuttner .................... | 137/595 |
| 3,223,113 | 12/1965 | Hopper ....................... | 137/467 |
| 3,426,507 | 2/1969 | Kossowski et al. ............ | 55/129 |
| 3,831,350 | 8/1974 | Gilles et al. ................. | 55/128 |
| 3,910,782 | 10/1975 | Struble et al. ................ | 55/444 |
| 3,958,605 | 5/1976 | Nishizu et al. ............... | 138/46 |
| 4,120,483 | 10/1978 | LeRoch ...................... | 251/228 X |
| 4,457,336 | 7/1984 | Allan et al. .................. | 137/601 |

FOREIGN PATENT DOCUMENTS

| | | |
|---|---|---|
| 629882 | 10/1961 | Canada ..................... 137/512.1 |
| 1423841 | 2/1971 | German Democratic Rep. . |
| 2601310 | 7/1977 | German Democratic Rep. . |
| 868543 | 10/1957 | United Kingdom . |

OTHER PUBLICATIONS

Technocheck Dampers and Valves for Nuclear Service, 16 pages, Published by Techno, Erie, Pa., 16505.
Nuclear Air Cleaning Handbook, Burchsted et al., ERDA 76-21, 1976, pp. 116-121.

Primary Examiner—Harold Joyce
Attorney, Agent, or Firm—Bell, Seltzer, Park & Gibson

[57] ABSTRACT

An air flow control apparatus is disclosed which is characterized by essentially zero leakage in its closed position, and by minimal air resistance in its open position. The apparatus includes a housing having an interior framework which defines a plurality of troughs of V-shaped cross section, and with each side of each trough including an opening. A closure is associated with each trough, which includes a pair of pivotally mounted plates which are movable between a spread apart position covering and closing the openings in the trough, and a collapsed position wherein the plates are substantially aligned with each other and spaced from the associated openings to permit free air flow therethrough. A continuous upstanding peripheral flange surrounds each opening, and a resilient pad is mounted on each plate of each closure so that the resilient pad mates with the outer edge of the flange when the closure is moved to the spread apart position, and so that the outer edge presses into the resilient pad to effect an air tight seal. The axis of the pivotal plates is adjustable to permit the pressure between the plates and outer edge of the flanges to be uniform about the periphery of each opening.

13 Claims, 8 Drawing Figures

U.S. Patent   Aug. 20, 1985   Sheet 3 of 3   4,535,811
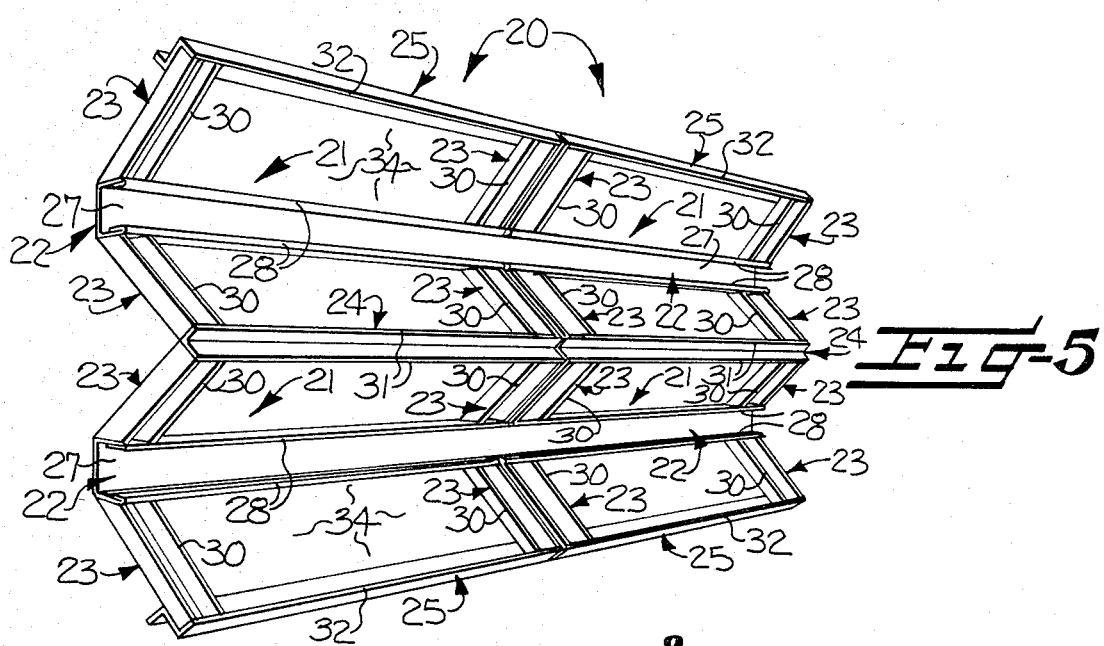
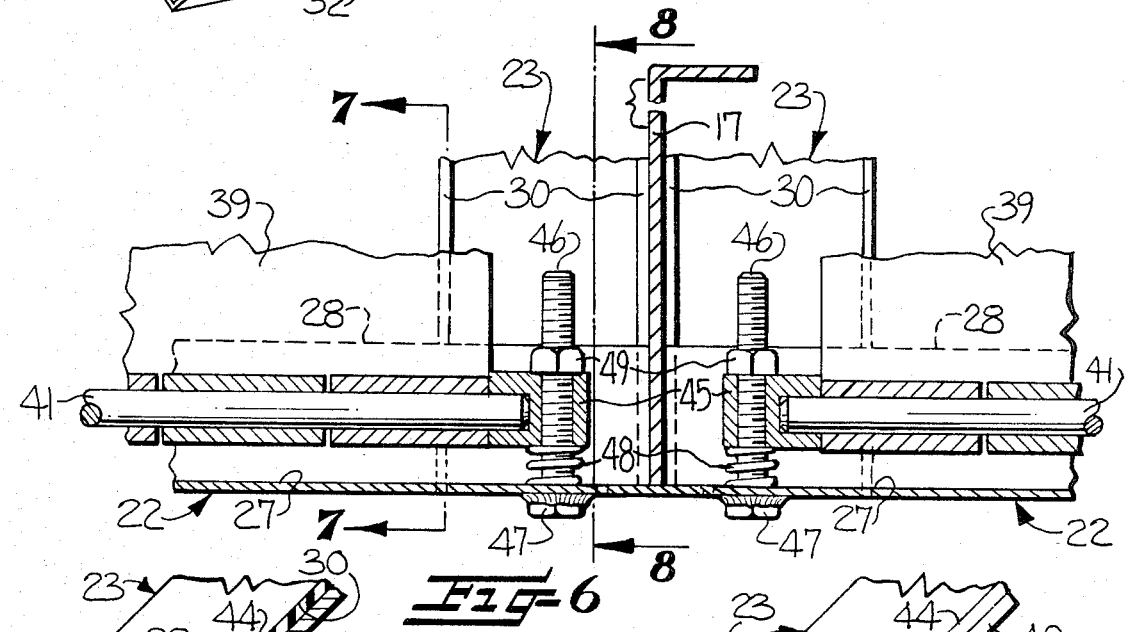
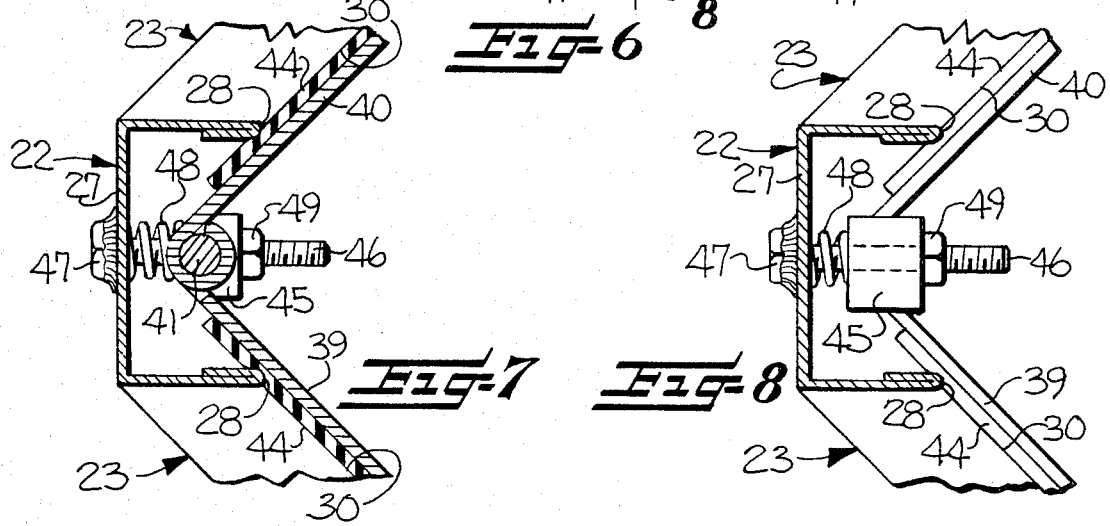

AIR FLOW CONTROL APPARATUS

The present invention relates to a novel air flow control apparatus of the type having the ability to function in a variety of ventilation systems as a shutoff damper, or as a flow control damper for modulating the air flow rate or a pressure differential within the system.

At the present time, there are a number of different damper configurations for regulating the air flow within a ventilation system. For example, one present damper comprises multiple blades which rotate in either the same or opposite directions to effect air flow control. Another common damper comprises one centrally pivoted blade mounted within the duct. Still another known design involves a damper with two blades which are pivoted from opposite sides of a central post in the duct.

While the above known dampers are satisfactory in many air ventilation systems, they are difficult to effectively seal in the closed position, and they have an unacceptable leakage rate in many air ventilation systems. For example, in the case of an exhaust air cleaning system of the type designed for the containment of hazardous materials, such as an airstream containing potentially radioactive materials, or in other high-risk applications, it is conventional to use ball-type shut-off valves of a type which are primarily designed for liquid service. However, these valves are very expensive, they require round rather than conventionally used rectangular air ducting, and they present a high resistance to the air flow in their open position and thus they result in a high pressure drop across the valve.

Copending and commonly owned application Ser. No. 398,404, filed July 14, 1982, now U.S. Pat. No. 4,457,336 discloses an improved air flow control damper which effectively overcomes many of the deficiencies of the prior dampers, and which may be used in air cleaning systems designed for the containment of nuclear or other hazardous materials, as well as in a variety of other more conventional air ventilation systems. The disclosed damper also has a very low leakage rate in the closed position.

It is an object of the present invention to provide an air flow control damper of the described type and which provides further improvements in its construction and efficiency. More particularly, it is an object to provide a damper of relatively simple and inexpensive construction, which has very low air resistance in the open position so as to minimize the pressure drop across the damper, and which has an essentially zero leakage rate in the closed position.

These and other objects and advantages of the present invention are achieved in the embodiment illustrated herein by the provision of a damper housing which includes a supporting framework mounted within the housing, and with the framework including at least one trough of V-shaped cross section extending across the housing. Each trough includes two opposite sides and an intermediate bight portion, and each side has a relatively large opening. A closure is operatively associated with each of the troughs for selectively opening and closing each of the openings therein, and each closure includes a pair of pivotally interconnected plates, with the pivotal axis disposed along the trough and adjacent the bight thereof, and so that the plates are pivotable between a spread-apart position covering the openings, and a collapsed position withdrawn from the openings. Also the plates are mounted so as to move toward and away from the sides in a generally perpendicular direction, and the pivotal axis of the plates is adjustable to permit the pressure between the plates and trough sides to be uniform about the periphery of each opening.

A continuous upstanding peripheral flange is mounted so as to surround each opening, and with the flange terminating in a continuous, coplanar, relatively narrow or thin outer edge. There is also provided a resilient pad mounted on each of the pivotable plates, with each pad being in alignment with the outer edge of the flange when the closure is moved to the spread apart position and so that the thin outer edge presses into and compresses the resilient pad to effect an air tight seal. Further, control means are provided for effecting selective movement of each of the closures between its spread-apart and collapsed positions, to permit full opening or full closure of the damper as well as modulation of the air flow rate.

Some of the objects having been stated, other objects and advantages will appear as the description proceeds, when taken in connection with the accompanying drawings in which FIG. 1 is a perspective view of an air flow control apparatus in accordance with the present invention;

FIG. 5 is a fragmentary perspective view of the supporting framework of the apparatus shown in FIG. 1;

Figure 1:
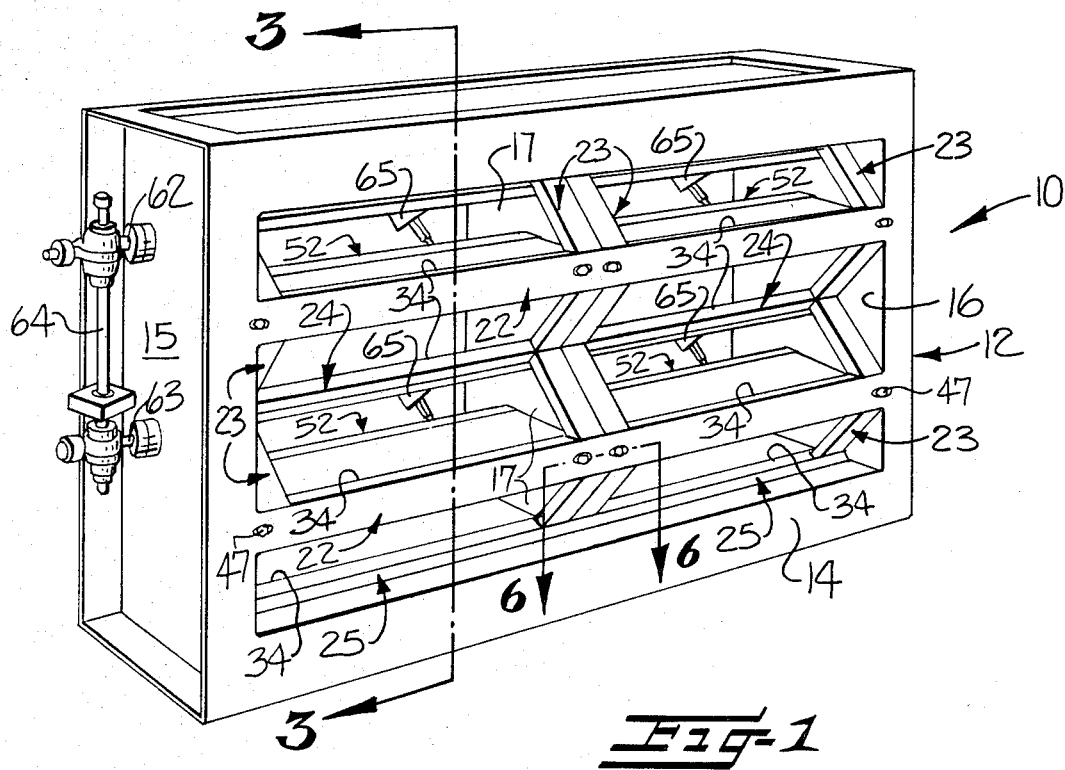
Figure 2:
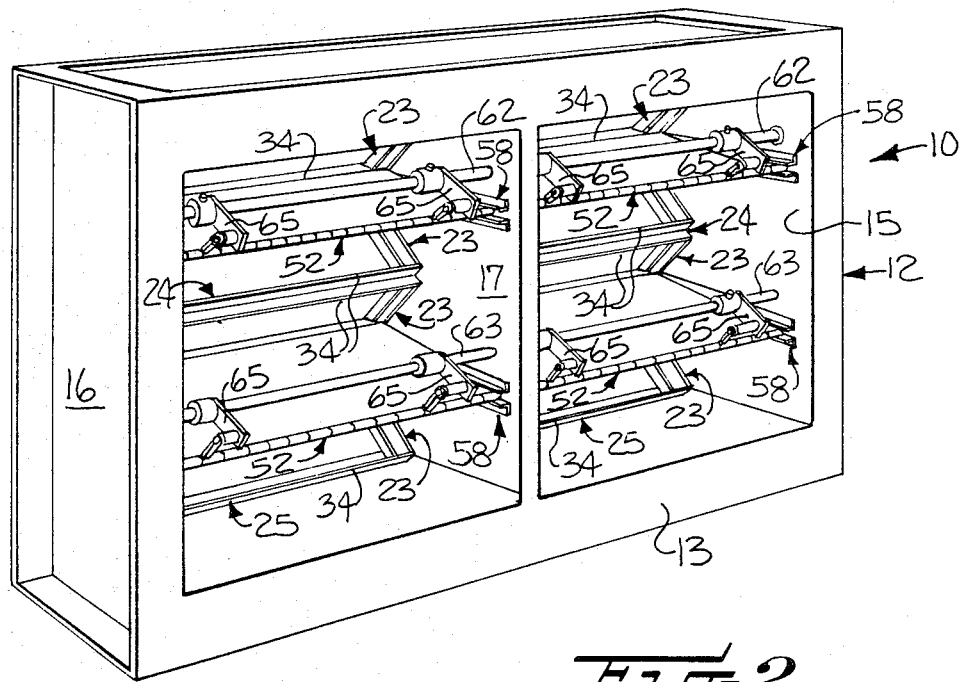
FIG. 2 is a perspective view of the opposite side of the apparatus shown in FIG. 1.

FIG. 6. is a fragmentary sectional plan view taken substantially along the line 6—6 of FIG. 1;

FIG. 7 is a fragmentary sectional view taken substantially along the line 7—7 of FIG. 6, but with the closures in their spread-apart position; and FIG. 8 is a fragmentary sectional view similar to FIG. 7 but taken substantially along the line 8—8 of FIG. 6.

Referring more particularly to the drawings, there is illustrated an air flow control apparatus 10 which embodies the features of the present invention. The apparatus 10 is adapted to be utilized, for example, in an air ventilation or air cleaning system, and the apparatus may form a part of a larger housing which also mounts a bank of high efficiency particulate air filters in the manner further described in copending application Ser. No. 398,404.

As illustrated, the apparatus 10 comprises a rectangular housing 12 fabricated from stainless steel or similar material, and which includes an open back wall 13, an apertured front wall 14, opposite side walls 15, 16 and an interior central panel 17 which divides the housing into two separate and substantially identical air passegeways therethrough.

A supporting framework 20 is disposed in each passageway, with each framework being positioned adjacent and forming a part of the front wall 14. As best seen in FIG. 5, each framework defines a pair of side by side troughs 21 of generally V-shaped cross section and which extend transversely across the passageway in a direction between the opposite side walls 15, 16 and parallel to the back and front walls 13, 14. Each trough 21 is composed of a U-shaped channel 22 positioned at the bight of the trough, two end channels 23, a side channel 24, and a side channel 25. The channel 22 comprises a bottom wall 27 and two parallel side walls 28, the end channels 23 include inner side walls 30, the side channel 24 includes two side walls 31 disposed at right angles, and the side channel 25 has a Z-shaped configuration and includes a side wall 32.

From the above, it will be seen that each side of each trough 21 includes an opening 34 of rectangular outline which occupies a substantial portion of the area of the side, and with each opening 34 being defined by the channel 22, two end channels 23, and either a side channel 24 or a side channel 25. Also, it will be seen that with respect to each opening 34, the wall 28 of the channel 22, the inner side walls 30 of the end channels, and either the side wall 31 of the side channel 24 or the side wall 32 of the side channel 25, collectively define an upstanding flange which encloses the periphery of the associated opening, and which has a continuous, coplanar, relatively thin outer edge.

The apparatus 10 further includes closure means operatively associated with each of the troughs for selectively opening and closing each of the openings 34 through the associated sides thereof. The closure means for each trough includes a closure 38 which includes a pair of flat plates 39, 40, a plate pin 41 pivotally interconnecting said plates, and means mounting the pin to the housing along an axis which extends along the trough and adjacent the bight thereof. More particularly, the axis of the pin 41 lies substantially along the intersection of the two planes defined by the outer edges of the above defined upstanding flanges of the two adjacent sides of the trough, note FIGS. 7 and 8. The flat plates 39, 40 are thus pivotable between a spread apart position (FIG. 4) wherein the plates overlie and cover the outer edge of the flanges of the two sides so as to close the openings 34 thereof, and a collapsed position (FIG. 3) wherein the two plates are withdrawn from the outer edges. Further, it will be seen that during such pivotal movement the flat plates 39, 40 move toward and away from the associated outer edges in a generally perpendicular direction, particularly when the plates closely approach the outer edges of the flanges. A resilient pad 44 is mounted to overlie the outer face of each of the flat plates, with portions of the pad being in alignment with the outer edge of the associated flange. The pad 44 preferably comprises a sheet of solid elastomeric material, such as silicone solid rubber, and which has thickness of at least about ¼ inch and a hardness of between about 20 to 30 durometers on the Shore A scale.

The apparatus 10 further includes control means for effecting selective movement of all of the closures of the housing between the spread apart and the collapsed positions. Also, as will become apparent, the control means permits the full closing or full opening of all of the openings 34 of the housing, as well as modulation of the air flow rate. Further, and importantly, it will be seen that the movement of the closures to the spread apart position causes the outer edges of each flange to press into and compress its associated resilient pad 44 to effect an air tight seal about each opening.

FIGS. 6–8 illustrate the preferred embodiment of the means for mounting the pin 41 of the closure to the housing 12. In particular, the mounting means comprises a support block 45 mounted at each of the pin 41, and a threaded member 46 extending freely through each block 45 in a direction perpendicular to the axis of the pin 41. More particularly, the threaded member 46 extends through the bottom wall 27 of the channel 22, with the head 47 being welded to the bottom wall so as to fixedly mount the threaded member to the housing while preventing air leakage therethrough. Further, each support block 45 is secured to its associated threaded member to permit adjustable movement along the threaded member. This adjustable securing means includes a helical spring 48 disposed about the threaded member on one side of the block, and a nut 49 threadedly received on the threaded member at the other side of the block. By this arrangement, each block 45 and thus the pin 41 may be adjustably moved along the threaded member 46, which corresponds to a direction which bisects the associated V-shaped trough in cross section, and each block and pin may then be fixed in a selected position along such line. This is turn permits adjustment of the flat plates 39, 40 in the open position of the closures, so as to assure a uniform pressure between the outer edge of the flange and the resilient pad about the entire periphery of each opening 34.

The closure means of each trough further comprises a hinge 52 composed of two segments 53, 54 which are pivotally interconnected by a hinge pin 55. The segments 53, 54 are in turn pivotally connected to respective ones of the free edges of the associated pair of plates 39, 40 by means of side pins 56. The axis of the hinge pin 55, and the pivotal axes of the side pins 56 are parallel to each other, and to the axis defined by the plate pin 41. Thus as wil be apparent from FIGS. 3 and 4, movement of the hinge 52 about its pivotal axis acts to either spread apart or collapse the pair of plates 39, 40. Also, it will be seen that the hinge pin 55 moves along a direction which bisects the associated V-shaped trough. To limit such movement of the hinge pin, there is provided a guide 58 mounted at each end of each trough, and specifically, on the inside of the side walls 15, 16, and opposite sides of the central panel 17. Each guide 58 is in the form of parallel brackets, which receive the associated end of the hinge pin 55 in the slot 60 formed therebetween.

The control means for concurrently actuating all of the closures of the apparatus includes a pair of spaced apart parallel shafts 62, 63 which are rotatably mounted to extend across the interior of the housing and across both air passageways. The shafts 62, 63 extend in a direction parallel to the troughs, and each shaft is generally aligned horizontally with the bight of an associated trough. The shafts extend through the central panel 17 and the side wall 15 of the housing, and are appropriately sealed at the side wall 15 while permitting the shafts to rotate. Also, the two shafts are rotatably interconnected outside the housing by an interconnecting shaft 64 (FIG. 1) so as to rotate in unison and in the same direction. The control means further includes a linkage 65 mounted between each of the hinge pins 55, and the associated shaft, so that rotation of the shafts causes horizontal movement of the pins 55, and thus either the spreading apart or the collapsing of the flat plates 39, 40 of the closures 38. The closures each further include abutment means 66 in the form of an L-shaped bracket fixed to the inside surface of the plate 39 for limiting the extent to which the plates may move toward each other in the collapsed position. By this arrangement, movement of both plates 39, 40 to a locked, non-operative position on the same side of the bisector between the sides of the trough, and as defined by the slot 60 of the guide 58 as seen in FIGS. 3 and 4, is precluded.

Figure 3:
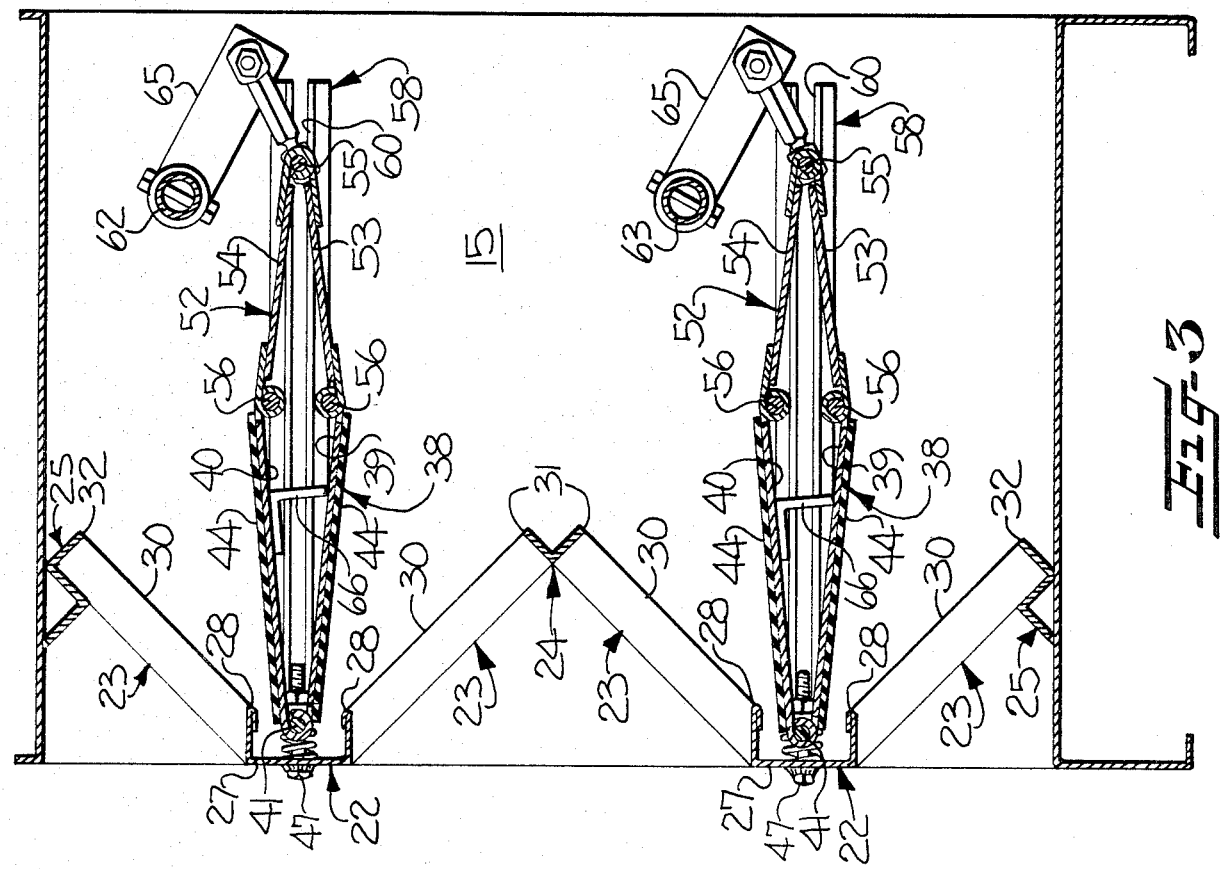
FIG. 3 is a fragmentary sectional side elevation view taken substantially along the line 3—3 of FIG. 1 and illustrating the closures in their collapsed or open position.
Figure 4:
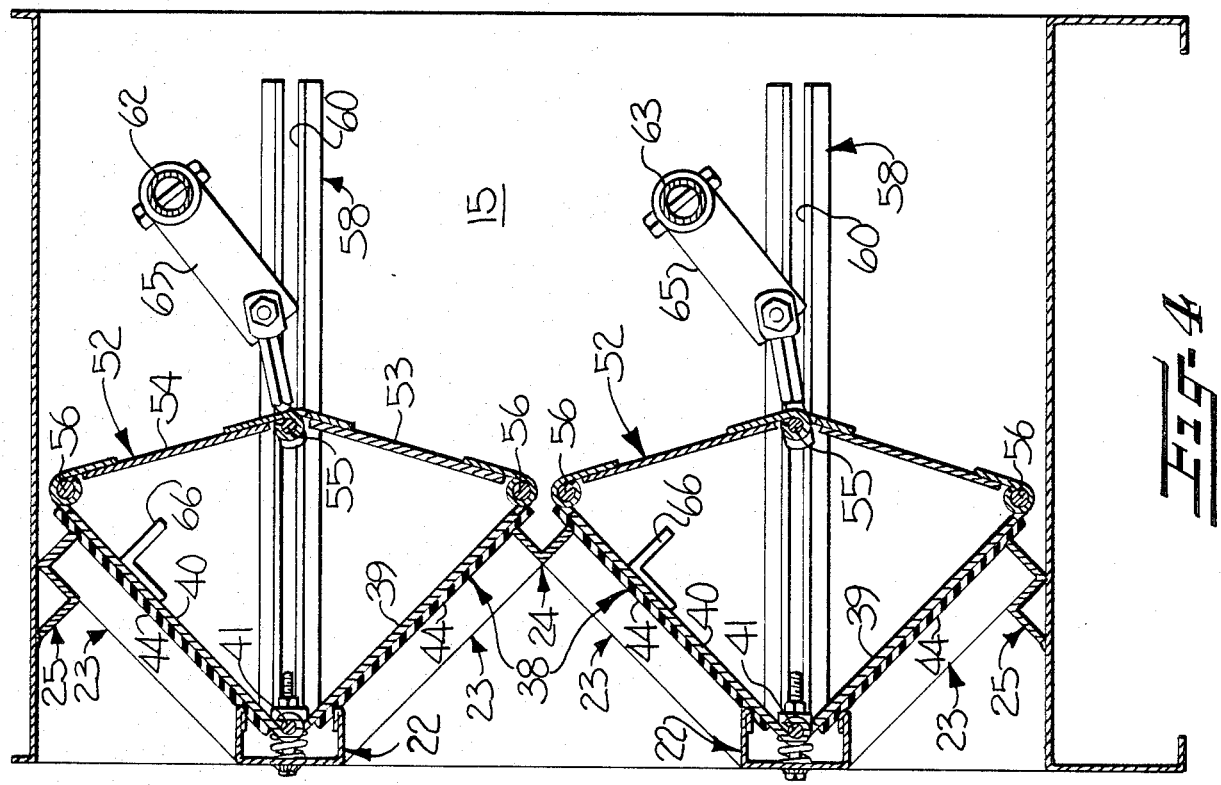
FIG. 4 is a view similar to FIG. 3 but illustrating the closure in their spread-apart or closed postion.

To now describe the operation of the apparatus, it will be assumed that the closures 38 are initially in the collasped position as illustrated in FIG. 3. As will be apparent, in the collapsed position, the plates 39, 40 and the hinge 52 are closely aligned with the direction of the slot 60, i.e. the bisector of the associated V-shaped trough. Also, the plates and hinge are entirely within the boundary of the U-shaped channel 22 viewed in the air flow direction through the apparatus, and thus the closures present very little air resistance in the open operative configuration. When it is desired to modulate or close the apparatus to air flow, the shafts 62, 63 are concurrently rotated by external means (not shown) and so that the hinge pins 55 move along the associated slots 60 in a direction toward the plate pins 41. As the plates 39, 40 approach the outer edge of the flanges, they will be seen to then relatively move in a direction generally perpendicular to the surface of the plate, and so that the outer edges compress the resilient pad 44 in the manner of a knife edge. Further, by reason of the adjustable mounting of the plate pins 41, the pressure between each flange and pad about the entire periphery of the opening 34 can be made uniform, and an air tight seal may thereby be effected. As a further advantage, it will be noted that in the collapsed position of the plates 39, 40 as seen in FIG. 3, each pad 44 is entirely separated from the flanges, to thereby alleviate the possibility of compression set of the material of the pad.

In the drawings and specification, there has been set forth a preferred embodiment of the invention, and although specific terms are employed, they are used in a generic and descriptive sense only, and not for purposes of limitation.

That which is claimed is:

1. An air flow control apparatus for regulating the volume of air flow in a ventilating system or the like, and comprising a housing defining an air passageway therethrough, supporting framework means mounted within said housing and including at least one trough of generally V-shaped cross section extending transversely across said housing, with said at least one trough including two opposite sides and an intermediate bight portion, and with each side having an opening which occupies a substantial portion of the area of such side, closure means operatively associated with said at least one trough for selectively opening and closing each of the openings in the associated sides thereof, said closure means including a pair of plates, a plate pin pivotally interconnecting said plates, and means mounting said plate pin to said housing along an axis which extends along the trough and adjacent the bight thereof and so that the plates are pivotable between a spread-apart position overlying and covering the adjacent openings and a collapsed position withdrawn from said openings, and such that said plates are relatively movable toward and away from the asociated sides in a generally perpendicular direction, and said means mounting said plate pin to said housing includes adjustable interconnection means for permitting adjustable movement of said pin along a direction which bisects the associated V-shaped trough in cross section and for fixing said plate pin in a selected position along such line, and such that a uniform pressure between each of the plates and the sides of the troughs about the entire periphery of each opening may be achieved, a continuous upstanding peripheral flange surrounding the periphery of each of said openings and mounted to one of either said trough sides or said plates, said upstanding flange having a continuous, coplanar, relatively thin outer edge, resilient pad means surrounding the periphery of each of said openings in alignment with the associated flange and mounted to the other of said trough sides or said plates, and control means for effecting selective movement of said closure means between said spread apart and said collapsed positions, to permit full closing or full opening of the openings as well as modulation of the air flow rate, and such that movement of said closure means to said spread apart position causes the thin outer edge of each flange to press into and compress its associated resilient pad means to effect an air tight seal about the entire periphery of each opening.

2. The air flow control apparatus as defined in claim 1 wherein said resilient pad means comprises a pad composed of a solid elastomeric material.

3. The apparatus as defined in claim 1 wherein said closure means further comprises a hinge composed of pivotally interconnected segments, with the segments being pivotally connected to respective ones of the free edges of said pair of plates, and with the hinge pivotal axis and the pivotal axes between the segments and plates being parallel to each other and to the pivotal axis between said pair of plates, whereby movement of the hinge about its pivotal axis acts to either spread apart or collapse the associated pair of plates.

4. The air flow control apparatus as defined in claim 3 wherein said closure means further comprises abutment means for limiting the extent to which said plates may move toward each other in said collapsed position and so as to preclude movement of both plates to the same side of a line which bisects the associated trough in cross section.

5. The apparatus as defined in claim 3 wherein said control means includes linkage means mounted to each of said hinges adjacent its pivotal axis, and means for actuating each of said linkage means to selectively either spread apart or collapse the hinges and thus each of the pair of plates.

6. The air flow control apparatus as defined in claim 5 wherein said means for actuating each of said linkage means comprises at least one shaft rotatably mounted to extend across the interior of said housing in a direction parallel to the transverse direction of said troughs, with at least one end of said shaft extending through the housing so as to be accessible from the exterior thereof, and wherein said linkage means comprises a linkage operatively interconnecting said shaft and each hinge and so that rotation of said shaft effects opening or closing of each hinge.

7. The air flow control apparatus as defined in claim 3 wherein each hinge includes a hinge pin disposed along the hinge pivotal axis, and guide means mounted to the interior of said housing and extending along a direction which bisects the associated V-shaped trough in cross section, and with said guide means engaging at least one end of said hinge pin so as to limit movement thereof along said direction.

8. An air flow control apparatus for regulating the volume of air flow in a ventilating system or the like, and comprising
a housing defining an air passageway therethrough,
supporting framework means mounted within said housing and including a plurality of troughs of generally V-shaped cross section extending transversely across said housing in a side by side arrangement, with each trough including two opposite sides and an intermediate bight portion, and with each side having an opening which occupies a substantial portion of the area of such side, and with each side including an upstanding flange enclosing the associated opening and having a continuous, coplanar, relatively thin outer edge,
closure means operatively associated with each of said troughs for selectively opening and closing each of the openings in the associated sides thereof, each of said closure means including a pair of flat plates, a plate pin pivotally interconnecting said plates, and means mounting said plate pin to said housing along an axis which extends along the trough and adjacent the bight thereof and so that the flat plates are pivotable between a spread apart position respectively overlying and covering the outer edge of the flange of the associated side so as to close the opening thereof, and a collapsed position withdrawn from said outer edges, and such that said flat plates are relatively movable toward and away from the associated outer edges in a generally perpendicular direction, and resilient pad means mounted to each of said flat plates in alignment with the outer edge of the associated flange, and said means mounting said plate pin to said housing includes adjustable interconnection means for permitting adjustable movement of said pin along a direction which bisects the associated V-shaped trough in cross section and for fixing said plate pin in a selected position along such line, and such that a uniform pressure between the flange outer edge and resilient pad means about the entire periphery of each opening may be achieved,
control means for effecting selective movement of each of said closure means between said spread apart and said collapsed positions, to permit full closing or full opening of the openings as well as modulation of the air flow rate, and such that movement of said closure means to said spread apart position causes the outer edge of each flange to press into and compress its associated resilient pad means to effect an air tight seal about each opening.

9. The air flow control apparatus as defined in claim 8 wherein in said collapsed position, said plates are closely aligned with a direction which bisects the associated V-shaped trough in cross section, and so as to minimize air resistance.

10. The air flow control apparatus as defined in claim 9 wherein said resilient pad means comprises a solid elastomeric sheet material having a thickness of at least about ¼ inch and a hardness of between about 20 to 30 durometer.

11. An air flow control apparatus for regulating the volume of air flow in a ventilating system or the like, and comprising
a housing defining an air passageway therethrough,
supporting framework means mounted within said housing and including at least one trough of generally V-shaped cross section extending transversely across said housing, with said at least one trough including two opposite sides and an intermediate bight portion, and with each side having an opening which occupies a substantial portion of the area of such side,
closure means operatively associated with said at least one trough for selectively opening and closing each of the openings in the associated sides thereof, said closure means including a pair of plates, a plate pin pivotally interconnecting said plates, and means mounting said plate pin to said housing along an axis which extends along the trough and adjacent the bight thereof and so that the plates are pivotable between a spread-apart position overlying and covering the adjacent openings and a collapsed position withdrawn from said openings, said mounting means including adjustable interconnection means for permitting adjustable movement of said plate pin along a direction which bisects the associated V-shaped trough in cross section and for fixing said pin in a selected position along such line, and such that a uniform pressure may be achieved between each of the plates and the sides of the troughs about the entire periphery of each opening,
resilient pad means surrounding the periphery of each opening and mounted to one of either said trough sides or said plates, and
control means for effecting selective movement of said closure means between said spread apart and said collapsed positions, to permit full closing or full opening of the openings as well as modulation of the air flow rate, and such that movement of said closure means to said spread apart position causes compression of said resilient pad means to effect an air tight seal about each opening.

12. The air flow control apparatus as defined in claim 11 wherein said adjustable interconnection means comprises a support block mounted at each end of said plate pin, a threaded member extending freely through each block in a direction perpendicular to the axis of said plate pin, with said threaded member having one end fixed to said housing, and means for adjustably mounting each of said support blocks to its associated threaded member so as to permit adjustable movement of each block along its threaded member.

13. The air flow control apparatus as defined in claim 12 wherein said means for adjustably securing each of said support blocks to its associated threaded member comprises a helical spring mounted upon said threaded member between said block and said housing and a nut threadedly received on said threaded member on the other side of said block.

* * * * *